United States Patent
Chu et al.

(10) Patent No.: US 10,264,544 B1
(45) Date of Patent: Apr. 16, 2019

(54) STATION SELECTION FOR NULL DATA PACKET (NDP) RANGING

(71) Applicant: Marvell International Ltd., Hamilton (BM)

(72) Inventors: Liwen Chu, San Ramon, CA (US); Hongyuan Zhang, Fremont, CA (US); Hui-Ling Lou, Sunnyvale, CA (US); Christian R. Berger, San Jose, CA (US); Niranjan Grandhe, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/979,100

(22) Filed: May 14, 2018

Related U.S. Application Data

(60) Provisional application No. 62/559,387, filed on Sep. 15, 2017, provisional application No. 62/505,486, filed on May 12, 2017.

(51) Int. Cl.
*H04W 64/00* (2009.01)
*H04L 5/00* (2006.01)
(Continued)

(52) U.S. Cl.
CPC ......... *H04W 64/003* (2013.01); *H04L 5/0053* (2013.01); *H04W 24/10* (2013.01); *H04W 72/1205* (2013.01); *H04W 84/12* (2013.01)

(58) Field of Classification Search
CPC ... H04W 84/12; H04W 24/02; H04W 72/046; H04W 52/0216; H04W 24/10; H04W 16/28; H04W 28/06; H04W 28/18; H04W 48/12; H04W 52/0229; H04W 72/0413; H04W 74/002; H04W 74/04; H04W 74/06; H04W 72/042; H04W 72/0446;
(Continued)

(56) References Cited

U.S. PATENT DOCUMENTS

| 9,166,660 B2 | 10/2015 | Chu et al. |
| 2005/0026563 A1 | 2/2005 | Leeper et al. |

(Continued)

OTHER PUBLICATIONS

Wenjun Gu, Null Data Frame: A Double Edged Sword in IEEE 802.11 WLANs, IEEE transactions on Parallel and distributed Systems, vol. 21, No. 7, Jul. 7, 2010.*

(Continued)

*Primary Examiner* — Fred A Casca

(57) ABSTRACT

A first communication determines, for a null data packet (NDP) ranging measurement procedure, i) a start time, ii) a time duration of each time slot of a plurality of time slots, and iii) a time interval between adjacent time slots. The first communication device generates one or more packets that include: i) an indication of the start time, ii) an indication of the time duration, and iii) an indication of the time interval, and transmits the one or more packets to multiple second communication devices prior to the NDP ranging measurement procedure. During the NDP ranging measurement procedure, the first communication device transmits a downlink NDP transmission to a group of second communication devices, and receives an uplink multi-user NDP transmission from the group of second communication devices.

20 Claims, 8 Drawing Sheets

(51) Int. Cl.
*H04W 24/10* (2009.01)
*H04W 72/12* (2009.01)
*H04W 84/12* (2009.01)

(58) Field of Classification Search
CPC ... H04W 24/08; H04W 28/065; H04W 48/16; H04W 52/0235; H04W 88/06; H04W 24/06; H04W 56/0015; H04W 72/0453; H04W 64/00; H04L 5/0048; H04L 5/0053; H04L 5/0007; H04L 27/2613; H04L 69/22; H04L 1/0003; H04L 1/0061; H03M 13/09
USPC .... 455/186.1, 41.2; 370/338, 328, 252, 310, 370/236, 241, 242, 350
See application file for complete search history.

(56) References Cited

U.S. PATENT DOCUMENTS

| | | |
|---|---|---|
| 2011/0255620 A1 | 10/2011 | Jones, IV et al. |
| 2013/0229996 A1 | 9/2013 | Wang et al. |
| 2015/0131517 A1 | 5/2015 | Chu et al. |
| 2016/0029373 A1 | 1/2016 | Seok |
| 2016/0119933 A1* | 4/2016 | Merlin .......... H04L 5/0048 370/312 |
| 2016/0323879 A1 | 11/2016 | Ghosh et al. |
| 2017/0142702 A1* | 5/2017 | Yu ............. H04W 72/0406 |
| 2017/0147702 A1* | 5/2017 | Brugler ......... G06F 17/30905 |
| 2017/0188390 A1 | 6/2017 | Adachi et al. |
| 2017/0202026 A1 | 7/2017 | Ahn et al. |
| 2017/0279864 A1 | 9/2017 | Chun et al. |
| 2018/0027561 A1 | 1/2018 | Segev et al. |

OTHER PUBLICATIONS

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmc™/D8.0, Aug. 2016, "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

Kwon et al., "SIG Field Design Principle for 11ax," Newracon, doc. IEEE 802.11-15/0344r2, Mar. 2015, 18 pages.

Kwon et al., "SIG Structure for UL PPDU," IEEE Draft, doc. IEEE 802.11-15/0574r0, vol. 802.11ax, 18 pages (May 11, 2015).

Merlin et al., "Trigger Frame Format," IEEE Draft, doc. IEEE 802.11-15/0877r1, vol. 802.11ax, No. 1, 16 pages (Jul. 13, 2015).

Seok et al., "HEW PPDU Format for Supporting MIMO-OFDMA," IEEE 802.11-14/1210r0, Sep. 14, 2014 (16 pages).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Wang, "IEEE P802.11, Wireless LANs, Specification Framework for TGaz," Revision 1.1, *Institute of Electrical and Electronics Engineers*, doc. IEEE 802.11-17/0462r4, May 11, 2017, 15 pages.

Zhu et al., "IEEE P802.11, Wireless LANs, Proposed 802.11az Functional Requirements," *Institute of Electrical and Electronics Engineers*, doc. IEEE 802.11-16/0424r4, 6 pages (Mar. 13, 2017).

* cited by examiner

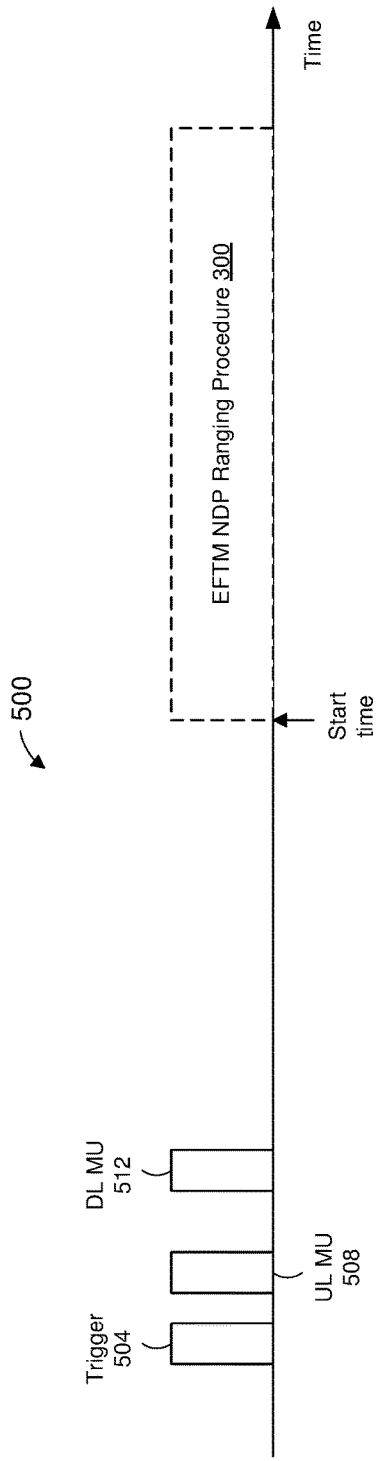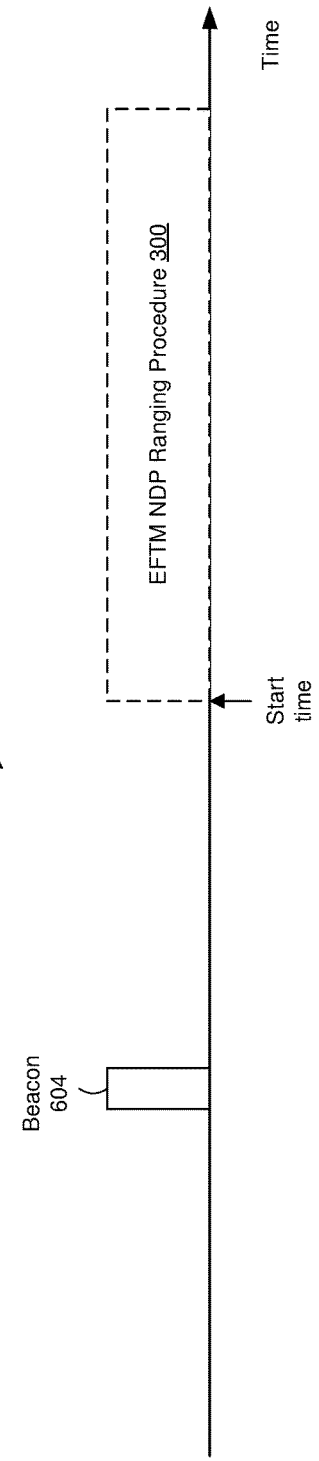
FIG. 5
FIG. 6

STATION SELECTION FOR NULL DATA PACKET (NDP) RANGING

CROSS REFERENCES TO RELATED APPLICATIONS

This application claims the benefit of U.S. Provisional Patent Application No. 62/505,486, entitled "STA Selection for Null Data Packet (NDP) Ranging," filed on May 12, 2017, and U.S. Provisional Patent Application No. 62/559,387, entitled "Station Polling for Multi-User Null Data Packet Ranging," filed on Sep. 15, 2017. The disclosures of all of the applications referenced above are hereby expressly incorporated herein by reference in their entireties.

FIELD OF TECHNOLOGY

The present disclosure relates generally to wireless communication systems, and more particularly to communication exchanges between wireless communication devices for measuring distances among the wireless communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and the determined distance. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

SUMMARY

In an embodiment, a method is for performing a ranging measurement procedure. The method includes: determining, at a first communication device, a schedule for a null data packet (NDP) ranging measurement procedure involving multiple second communication devices, including determining i) a start time of the NDP ranging measurement procedure, ii) a time duration of each time slot of a plurality of time slots during the NDP ranging measurement procedure, and iii) a time interval between adjacent time slots of the plurality of time slots during the NDP ranging measurement procedure, wherein each time slot of the plurality of time slots is at least for the first communication device to schedule one or more second communication devices to participate in an exchange of NDPs for ranging measurement during the ranging measurement procedure; generating, at the first communication device, one or more packets that include: i) an indication of the start time of the NDP ranging measurement procedure, ii) an indication of the time duration of each time slot of the plurality of time slots during the NDP ranging measurement procedure, and iii) an indication of the time interval between adjacent time slots of the plurality of time slots during the NDP ranging measurement procedure; transmitting, by the first communication device, the one or more packets to the multiple second communication devices prior to the NDP ranging measurement procedure; during the NDP ranging measurement procedure, transmitting, by the first communication device, a downlink NDP transmission to a group of second communication devices; and during the NDP ranging measurement procedure, receiving, at the first communication device, an uplink multi-user NDP transmission from the group of second communication devices.

In another embodiment, an apparatus comprises a network interface device associated with a first communication device. The network interface device is implemented on one or more integrated circuit (IC) devices, and is configured to: determine a schedule for a null data packet (NDP) ranging measurement procedure involving multiple second communication devices, including determining i) a start time of the NDP ranging measurement procedure, ii) a time duration of each time slot of a plurality of time slots during the NDP ranging measurement procedure, and iii) a time interval between adjacent time slots of the plurality of time slots during the NDP ranging measurement procedure, wherein each time slot of the plurality of time slots is at least for the first communication device to schedule one or more second communication devices to participate in an exchange of NDPs for ranging measurement during the ranging measurement procedure; generate one or more packets that include i) an indication of the start time of the NDP ranging measurement procedure, ii) an indication of the time duration of each time slot of the plurality of time slots during the NDP ranging measurement procedure, and iii) an indication of the time interval between adjacent time slots of the plurality of time slots during the NDP ranging measurement procedure; transmit the one or more packets to the multiple second communication devices prior to the NDP ranging measurement procedure; during the NDP ranging measurement procedure, transmit a downlink NDP transmission to a group of second communication devices; and during the NDP ranging measurement procedure, receive an uplink multi-user NDP transmission from the group of second communication devices.

In yet another embodiment, a method associated with a ranging measurement procedure includes: receiving, at a first communication device, one or more first packets from a second communication device, wherein the one or more packets include scheduling information regarding a null data packet (NDP) ranging measurement procedure involving the first communication device, the second communication device, and one or more other communication devices, wherein the scheduling information includes i) an indication of a start time of the NDP ranging measurement procedure, ii) an indication of a time duration of each time slot of a plurality of time slots during the NDP ranging measurement procedure, and iii) an indication of a time interval between adjacent time slots of the plurality of time slots during the NDP ranging measurement procedure; processing, at the first communication device, the scheduling information in the one or more first packets to determine i) the start time of the NDP ranging measurement procedure, ii) the time duration of each time slot of the plurality of time slots during the NDP ranging measurement procedure, and iii) the time interval between adjacent time slots of the plurality of time slots during the NDP ranging measurement procedure; using at least i) the start time of the NDP ranging measurement procedure, and ii) the time interval between adjacent time slots during the NDP ranging measurement procedure, determining, at the first communication device, at least i) a start time of a first time slot among the plurality of time slots, and ii) a start time of a second time slot among the plurality of time slots, wherein the second time slot follows the first time slot; during the first time slot, receiving, at the first communication device, one or more second packets from the second communication device, wherein the one or more second packets include information that indicates whether the first communication device is to participate in an NDP ranging measurement exchange prior to the second time slot; and processing, at the first communication device, the information in the one or more second packets to determine whether the first communication device is to participate in the NDP ranging measurement exchange prior to the second time slot. The method also includes: when the first communication device determines that the first communication device is to participate in the NDP ranging measurement prior to the second time slot, participating in the NDP ranging measurement exchange prior to the second time slot, including: transmitting, by the first communication device, a first NDP transmission to the second communication device, and receiving, at the first communication device, a second NDP transmission from the second communication device. The method further includes: when the first communication device determines that the first communication device is not to participate in the NDP ranging measurement prior to the second time slot: transitioning the first communication device to a low power state, and transitioning the first communication device from the low power state to the active state prior to the determined start time of the second time slot.

In still another embodiment, an apparatus comprises a network interface device associated with a first communication device. The network interface device is implemented on one or more integrated circuit (IC) devices, and is configured to: receive one or more first packets from a second communication device, wherein the one or more packets include scheduling information regarding a null data packet (NDP) ranging measurement procedure involving the first communication device, the second communication device, and one or more other communication devices, wherein the scheduling information includes i) an indication of a start time of the NDP ranging measurement procedure, ii) an indication of a time duration of each time slot of a plurality of time slots during the NDP ranging measurement procedure, and iii) an indication of a time interval between adjacent time slots of the plurality of time slots during the NDP ranging measurement procedure; process the scheduling information in the one or more first packets to determine i) the start time of the NDP ranging measurement procedure, ii) the time duration of each time slot of the plurality of time slots during the NDP ranging measurement procedure, and iii) the time interval between adjacent time slots of the plurality of time slots during the NDP ranging measurement procedure; use at least i) the start time of the NDP ranging measurement procedure, and ii) the time interval between adjacent time slots during the NDP ranging measurement procedure, determining, at the first communication device, at least i) a start time of a first time slot among the plurality of time slots, and ii) a start time of a second time slot among the plurality of time slots, wherein the second time slot follows the first time slot; during the first time slot, receive one or more second packets from the second communication device, wherein the one or more second packets include information that indicates whether the first communication device is to participate in an NDP ranging measurement exchange prior to the second time slot; and process the information in the one or more second packets to determine whether the first communication device is to participate in the NDP ranging measurement exchange prior to the second time slot. The network interface device is further configured to: when the network interface device determines that the first communication device is to participate in the NDP ranging measurement exchange prior to the second time slot, participate in the NDP ranging measurement exchange, including: transmitting a first NDP transmission to the second communication device, and receiving a second NDP transmission from the second communication device. The network interface device is also configured to: when the network interface device determines that the first communication device is not to participate in the NDP ranging measurement prior to the second time slot: transition the network interface device to a low power state, and transitioning the network interface device from the low power state to the active state prior to the determined start time of the second time slot.

BRIEF DESCRIPTION OF THE DRAWINGS

FIG. 5 is a timing diagram of another example transmission exchange in which the AP 114 transmits one or more MU packets to a plurality of client stations prior to the MU ranging measurement procedure of FIG. 3 to provide timing information regarding the MU ranging measurement procedure of FIG. 3, according to another embodiment.

FIG. 6 is a timing diagram of another example transmission exchange in which the AP 114 transmits a broadcast packet prior to the MU ranging measurement procedure of FIG. 3 to provide timing information regarding the MU ranging measurement procedure of FIG. 3, according to another embodiment.

DETAILED DESCRIPTION

Techniques for organizing ranging measurement sessions for a group of communication devices described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement techniques are utilized in other types of wireless communication systems such as personal area networks (PANs), mobile communication networks such as cellular networks, metropolitan area networks (MANs), etc.

Figure 1:
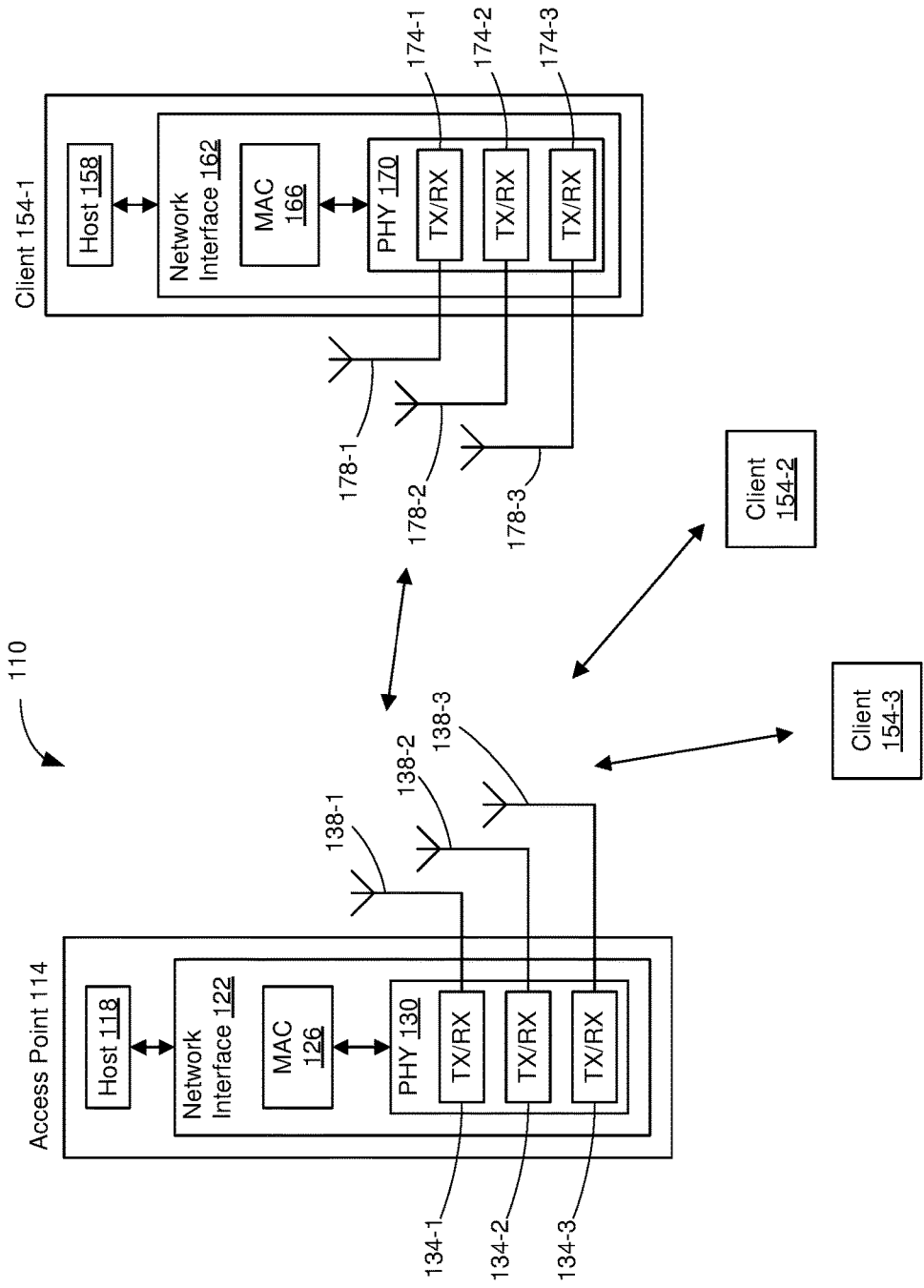
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2A:
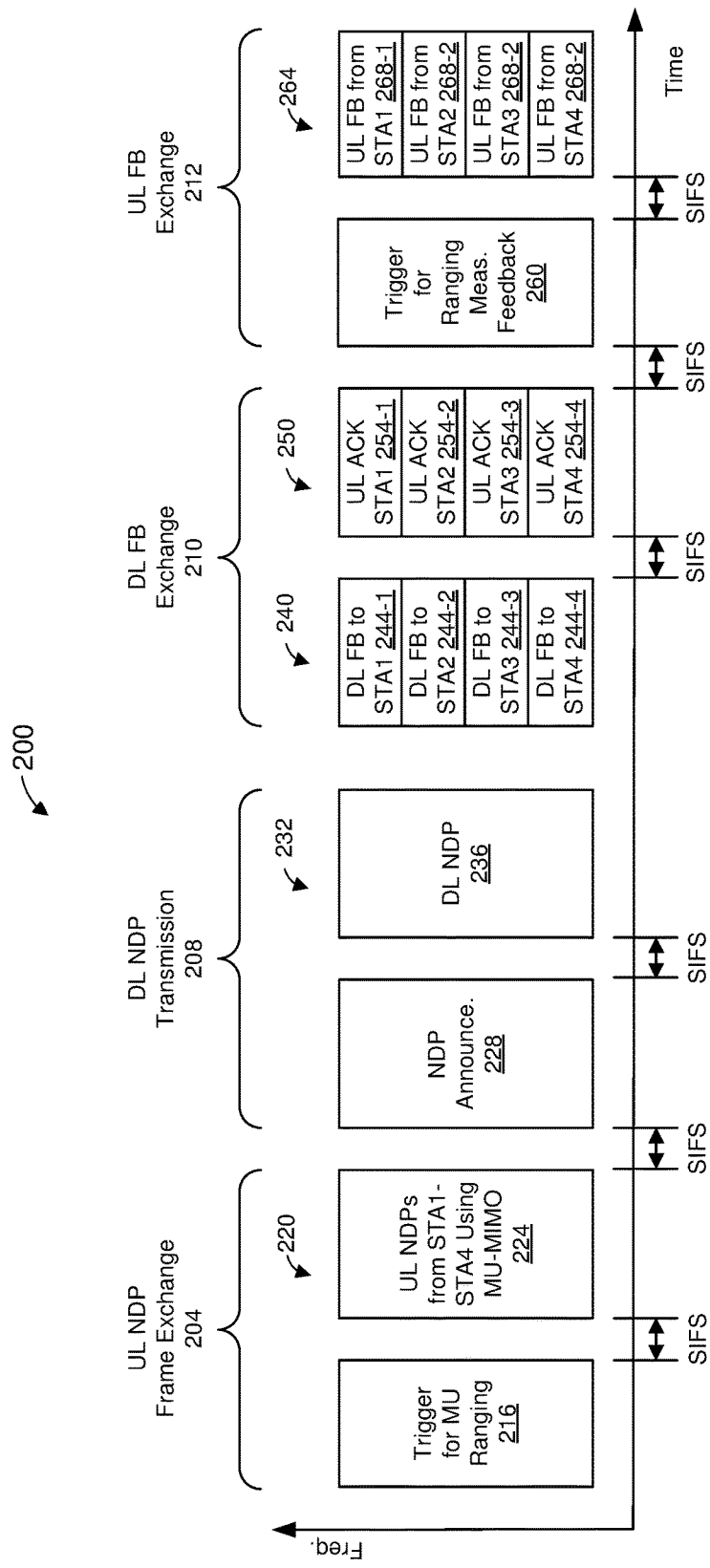
FIG. 2A is a diagram of an example multi-user (MU) ranging measurement exchange in an MU ranging measurement procedure, according to an embodiment.

FIG. 2A is a diagram of an example multi-user (MU) ranging measurement exchange 200 in an MU ranging measurement procedure, according to an embodiment. The diagram 200 is described in the context of the example network 110 merely for explanatory purposes. In some embodiments, signals illustrated in FIG. 2A are generated by other suitable communication devices in other suitable types of wireless networks.

The MU ranging measurement exchange 200 corresponds to an AP-initiated MU ranging measurement exchange, according to an embodiment. The MU ranging measurement exchange 200 includes an uplink (UL) null data packet (NDP) frame exchange 204, a downlink (DL) NDP transmission portion 208, a DL feedback frame exchange 210, and an UL feedback frame exchange 212. In an embodiment, the uplink UL NDP frame exchange 204, the DL NDP transmission portion 208, the DL feedback frame exchange 210, and the UL feedback frame exchange 212 occur within a single transmit opportunity period (TXOP). In another embodiment, the uplink UL NDP frame exchange 204, the DL NDP transmission portion 208, the DL feedback frame exchange 210, and the UL feedback frame exchange 212 do not occur within a single TXOP. For example, the uplink UL NDP frame exchange 204 and the DL NDP transmission portion 208 occur within a single TXOP, whereas the DL feedback frame exchange 210 and the UL feedback frame exchange 212 occur after the single TXOP (e.g., in another TXOP or in multiple other TXOPs).

In the UL NDP exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the PPDU 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more UL NDPs 224 from multiple client stations 154, e.g., STA1, STA2, STA3, and STA4. The two or more of the UL NDPs 224 are transmitted within a same frequency band via different spatial streams (e.g., MU-MIMO). In another embodiment, the UL MU transmission 220 includes an UL orthogonal frequency division multiple access (OFDMA) transmission having two or more UL NDPs 224 from multiple client stations 154, e.g., STA1, STA2, STA3, and STA4, in different respective frequency bandwidth portions. In yet another embodiment, three or more UL NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The UL NDPs 224 include PHY preambles having one or more short training fields (STFs), one or more long training fields (LTFs) and one or more signal fields, in an embodiment. The UL NDPs 224 omit data portions.

When transmitting the UL NDPs 224, each client station 154 records a time $t_{1,k}$ at which the client station 154 began transmitting the UL NDP 224, where k is an index indicating the particular client station 154. Similarly, when the AP 114 receives each UL NDP 224, the AP 114 records a time $t_{2,k}$ at which the AP 114 began receiving the UL NDP 224.

In some embodiments, when transmitting the UL NDPs 224, each of at least some of the client stations 154 (e.g., client stations 154 with multiple antennas 174) records an angle of departure, $AoD_{1,k}$, at which the UL NDP 224 left the antennas 178 of the client station 154. Similarly, when the AP 114 receives each UL NDP 224, the AP 114 records an angle of arrival, $AoA_{1,k}$, at which the UL NDP 224 arrived at the antennas 138 of the AP 114.

Figure 2B:
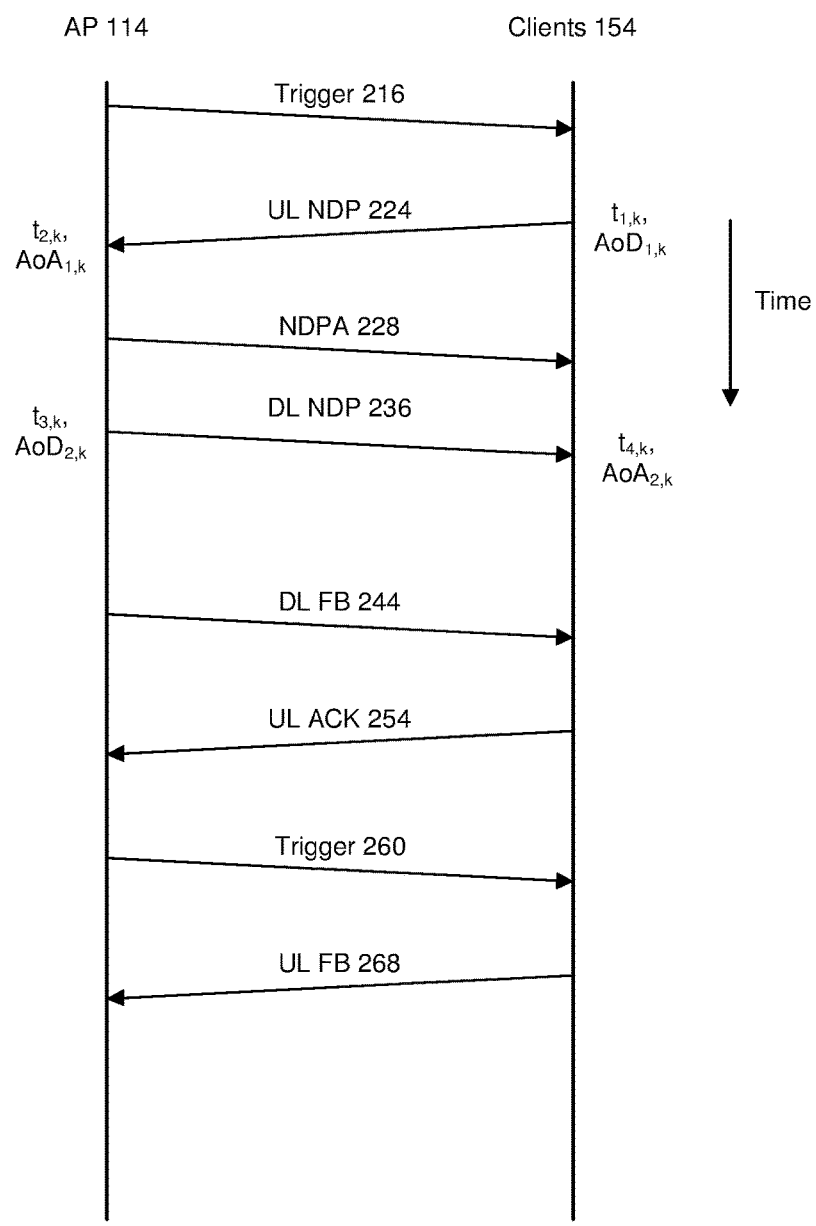
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, each client station 154 records the time $t_{1,k}$ at which the client station 154 began transmitting the UL NDP 224, and records the $AoD_{1,k}$ at which the UL NDP 224 left the antennas 178 of the client station 154. Additionally, the AP 114 records the time $t_{2,k}$ at which the AP 114 began receiving each UL NDP 224, and the $AoA_{1,k}$ at which each UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment.

The AP 114 generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes DL NDPs 236 to respective client stations 154. In another embodiment, the AP 114 transmits a single DL NDP 236 using a SU DL transmission (e.g., with a broadcast destination address) to the client stations 154. The DL NDP(s) 236 include PHY preamble(s) having one or more STFs, one or more LTFs and one or more signal fields, in an embodiment. The DL NDP(s) 236 omit data portions. In an embodiment, different DL NDPs 236 are transmitted in different frequency bandwidth portions (e.g., OFDMA). In some embodiments, two or more of the DL NDPs 236 are transmitted within a same frequency band (e.g., two or more of the DL NDPs 236 span the same frequency band) using different spatial streams (e.g., the two or more DL NDPs 236 are transmitted using MU-MIMO). In another embodiment, a single DL NDP 236 is broadcast to the client stations 154.

When transmitting the DL NDP(s) 236, the AP 114 records a time $t_{3,k}$ at which the AP 114 began transmitting the DL NDP(s) 236. Similarly, when each client station 154 receives the corresponding DL NDP 236, the client station 154 records a time $t_{4,k}$ at which the client station 154 began receiving the DL NDP 236. As illustrated in FIG. 2B, the AP 114 records the time $t_{3,k}$ at which the AP 114 began transmitting the DL NDP 236, and the client station 154 records the time $t_{4,k}$ at which the client station 154 began receiving the DL NDP 236.

In some embodiments, when transmitting the DL NDP 236, the AP 114 records an $AoD_{2,k}$ at which the DL NDP 236 left the antennas 138 of the AP 114. Similarly, when the client station 154 receives the DL NDP 236, the client station 154 records an $AoA_{2,k}$ at which the DL NDP 236 arrived at the antennas 178 of the client station 154.

In some embodiments, the MU ranging measurement exchange 200 omits the DL PPDU 228. For example, the AP 114 begins transmitting the DL PPDU 232 a defined time period after an end of the UL MU transmission 220. In an embodiment, the defined time period is SIFS. In other embodiments, another suitable time period is utilized.

The DL FB exchange 210 includes a DL PPDU 240 (which may be a DL OFDMA transmission or a DL MU-MIMO transmission) having FB frames 244 for multiple client stations 154, e.g., STA1, STA2, STA3, and STA4. The FB frames 244 are illustrated in FIG. 2A as being transmitted in different frequency bandwidth portions. In some embodiments, two or more of the FB frames 244 are transmitted within a same frequency band (e.g., two or more of the FB frames 244 span the same frequency band) using different spatial streams (e.g., the two or more FB frames 244 are transmitted using MU-MIMO).

In some embodiments, the DL PPDU 240 is transmitted a defined time period after an end of the DL PPDU 232. In an embodiment, the defined time period is SIFS. In other embodiments, another suitable time period is utilized. In other embodiments, the DL PPDU 240 is transmitted after some delay. As discussed above, in some embodiments, the DL PPDU 240 is not transmitted within a same TXOP as the DL PPDU 232.

The FB frames 244 respectively include the recorded times $t_{2,k}$ and $t_{3,k}$. In some embodiments, each of one or more FB frames 244 respectively includes the recorded angles $AoA_{1,k}$ and $AoD_{2,k}$. In some embodiments, the FB frames 244 optionally also include respective channel estimate information determined by the AP 114 based on reception of the UL NDPs 224.

After receipt of the FB frames 244, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, one or more of the client stations 154 calculates estimated positions of one or more of the client stations using the calculated times-of-flight. For example, the client station 154-1 uses triangulation techniques to calculate an estimated positions of the client station 154-1 using the calculated time-of-flight. In some embodiments, the client station 154-1 calculates an estimated position of the client station also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of the client station 154-1.

Responsive to receipt of the FB frames 244, the client stations 154 generate an UL MU transmission 250 (which may be an UL OFDMA transmission or an UL MU MIMO transmission) that includes respective ACK frames 254 from respective client stations, according to an embodiment. The client stations 154 transmit as part of the UL MU transmission 250 a defined time period after an end of the DL transmission 240. In an embodiment, the defined time period is SIFS. In other embodiments, another suitable time period is utilized. The ACK frames 254 are illustrated in FIG. 2A as being transmitted in different frequency bandwidth portions. In some embodiments, two or more of the ACK frames 254 are transmitted within a same frequency band (e.g., two or more of the ACK frames 254 span the same frequency band) using different spatial streams (e.g., the two or more ACK frames 254 are transmitted using MU-MIMO). In some embodiments, the client stations 154 do not transmit the UL MU transmission 250 in order to reduce a duration of the MU ranging measurement exchange 200 and improve efficiency.

In an embodiment, the AP 114 transmits a DL PPDU 260 a defined time period after an end of the UL MU transmission 250. In an embodiment, the defined time period is SIFS. In other embodiments, another suitable time period is utilized. The PPDU 260 includes a trigger frame to cause the group of client stations 154 to simultaneously transmit, as part of an UL MU transmission 264, uplink PPDUs 268 that include ranging measurement feedback. The trigger frame in the PPDU 260 causes multiple client stations 154 to begin simultaneously transmitting the UL MU transmission 264 a defined time period after an end of the PPDU 260. In an embodiment, the defined time period is SIFS. In other embodiments, another suitable time period is utilized.

The UL MU transmission 264 (which may be an UL OFDMA transmission or an UL MU-MIMO transmission) includes UL PPDUs 268 from multiple client stations 154, e.g., STA1, STA2, STA3, and STA4. The UL PPDUs 268 are illustrated in FIG. 2A as being transmitted in different frequency bandwidth portions. In some embodiments, two or more of the UL PPDUs 268 are transmitted within a same frequency band (e.g., two or more of the UL PPDUs 268 span the same frequency band) using different spatial streams (e.g., the two or more UL PPDUs 268 are transmitted using MU-MIMO).

The UL PPDUs 268 correspond to uplink ranging measurement feedback packets. The PPDUs 268 respectively include the recorded times $t_{1,k}$ and $t_{4,k}$. In some embodiments, each of one or more PPDUs 268 respectively includes the recorded angles $AoD_{1,k}$ and $AoA_{2,k}$. In some embodiments, the PPDUs 268 optionally also include respective channel estimate information determined by the client station 154 based on reception of the DL NDP 236.

After receipt of the PPDUs 268, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining positions of communication devices.

In another embodiment, the order, in time, of the DL FB exchange 210 and the UL FB exchange 212 is reversed, and the UL FB exchange 212 occurs before the DL FB exchange 210. In some embodiments, the DL FB exchange 210 is omitted. In some embodiments, the UL FB exchange 212 is omitted.

As discussed above, DL FB PPDUs 244 may include, in addition to recorded times $t_{2,k}$ and $t_{3,k}$, one or more of i) the recorded angles $AoA_{1,k}$, ii) the recorded angles $AoD_{2,k}$, and iii) channel estimate information determined by the AP 114 based on reception of the UL NDPs 224. In some embodiments, channel estimate information can be conveyed in different granularities. For example, in some embodiments, one respective channel measurement is provided for each OFDM tone, or one respective channel measurement is provided for each group of n OFDM tones, where n is an integer greater than one. Sending one respective channel measurement for each group of n OFDM tones requires less total channel estimate information to be conveyed across the wireless channel medium, as opposed to sending one respective channel measurement for each OFDM tone. In some embodiments, a channel measurement can be quantized to different numbers of bits. For instance, a channel measurement can represented using m bits, where m is a positive integer chosen from a suitable set of different positive integers corresponding to different quantization granularities. Sending channel measurements that are each represented using m bits requires less total channel estimate information to be conveyed across the wireless channel medium, as opposed to sending channel measurements that are each represented using m+2 bits, for example. Thus, different granularities channel estimate information correspond to different value(s) of one or both of n and m, according to an embodiment.

In some embodiments, one or more client stations 154 (e.g., one or more MAC processors in the client stations 154 (e.g., the MAC processor 166)) determine that the AP 114 is to include, in one or more of the DL FB PPDUs 244, one or more of i) recorded angle(s) $AoA_{1,k}$, ii) recorded angle(s)

$AoD_{2,k}$, and iii) channel estimate information determined by the AP 114 based on reception of the UL NDPs 224. In some embodiments, the AP 114 (e.g., the MAC processor 126) determines the granularity(ies) of channel estimate information to be included in one or more of the UL FB PPDUs 248/316. In some embodiments, one or more client stations 154 (e.g., one or more MAC processors in the client stations 154 (e.g., the MAC processor 166)) generates one or more MAC frames that include information configured to cause the AP 114 to include, in one or more of the DL FB PPDUs 244, one or more of i) recorded angle(s) $AoA_{1,k}$, ii) recorded angle(s) $AoD_{2,k}$, and iii) channel estimate information determined by the AP 114 based on reception of the UL NDPs 224. In some embodiments, contents of the sounding feedback, e.g., time stamp(s), AoA, AoD, channel estimation information, etc., is decided during an NDP sounding negotiation that occurs prior to the MU ranging measurement exchange 200.

Also as discussed above, UL FB PPDUs 268 may include, in addition to recorded times $t_{1,k}$ and $t_{4,k}$, one or more of i) the recorded angles $AoD_{1,k}$, ii) the recorded angles $AoA_{2,k}$, and iii) channel estimate information determined by client stations 154 based on reception of the DL NDP(s) 236.

In some embodiments, the AP 114 (e.g., the MAC processor 126) determines that one or more client stations 154 are to include, in one or more of the UL FB PPDUs 268, one or more of i) recorded angle(s) $AoD_{1,k}$, ii) recorded angle(s) $AoA_{2,k}$, and iii) channel estimate information determined by client station(s) 154 based on reception of the DL NDPs 236. In some embodiments, the AP 114 (e.g., the MAC processor 126) determines the granularity(ies) of channel estimate information to be included in one or more of the UL FB PPDUs 268. In some embodiments, the AP 114 (e.g., the MAC processor 126) generates one or more MAC frames that include information configured to cause one or more of the client stations 154 to include, in one or more of the UL FB PPDUs 268, one or more of i) recorded angle(s) $AoD_{1,k}$, ii) recorded angle(s) $AoA_{2,k}$, and iii) channel estimate information determined by client station(s) 154 based on reception of the DL NDPs 236. In some embodiments, contents of the sounding feedback, e.g., time stamp(s), AoA, AoD, channel estimation information, etc., is decided during an NDP sounding negotiation that occurs prior to the MU ranging measurement exchange 200. In some embodiments, contents of the sounding feedback is specified in a trigger frame (e.g., trigger frame 216 and/or 260) or an NDP Announcement frame (e.g., NDPA 228).

If the one or more of the client stations 154 are to include, in one or more of the UL FB PPDUs 268, channel estimate information, the one or more MAC frames may include information that indicates the granularity(ies) of the channel estimate information to be included in one or more of the UL FB PPDUs 268, according to some embodiments. The AP 114 then transmits the one or more MAC frames prior to the MU ranging measurement exchange 200. In some embodiments, granularity(ies) of the channel estimation information is decided during an NDP sounding negotiation that occurs prior to the MU ranging measurement exchange 300. In some embodiments, granularity(ies) of the channel estimation information is specified in a trigger frame (e.g., trigger frame 216 and/or 260) or an NDP Announcement frame (e.g., NDPA 228).

In an embodiment, an example single-user (SU) ranging measurement exchange between the AP 114 and a client station 154 includes transmission exchanges similar to those discussed above with respect to FIGS. 2A and 2B. For example, the example SU ranging measurement exchange includes the AP 114 transmitting a DL NDP to the client station 154, and the client station 154 transmitting an UL NDP to the AP 114. The example SU ranging measurement exchange also includes one or both of i) the AP 114 transmitting ranging measurement feedback information to the client station 154, and ii) the client station 154 transmitting ranging measurement feedback information to the AP 114.

Figure 3:
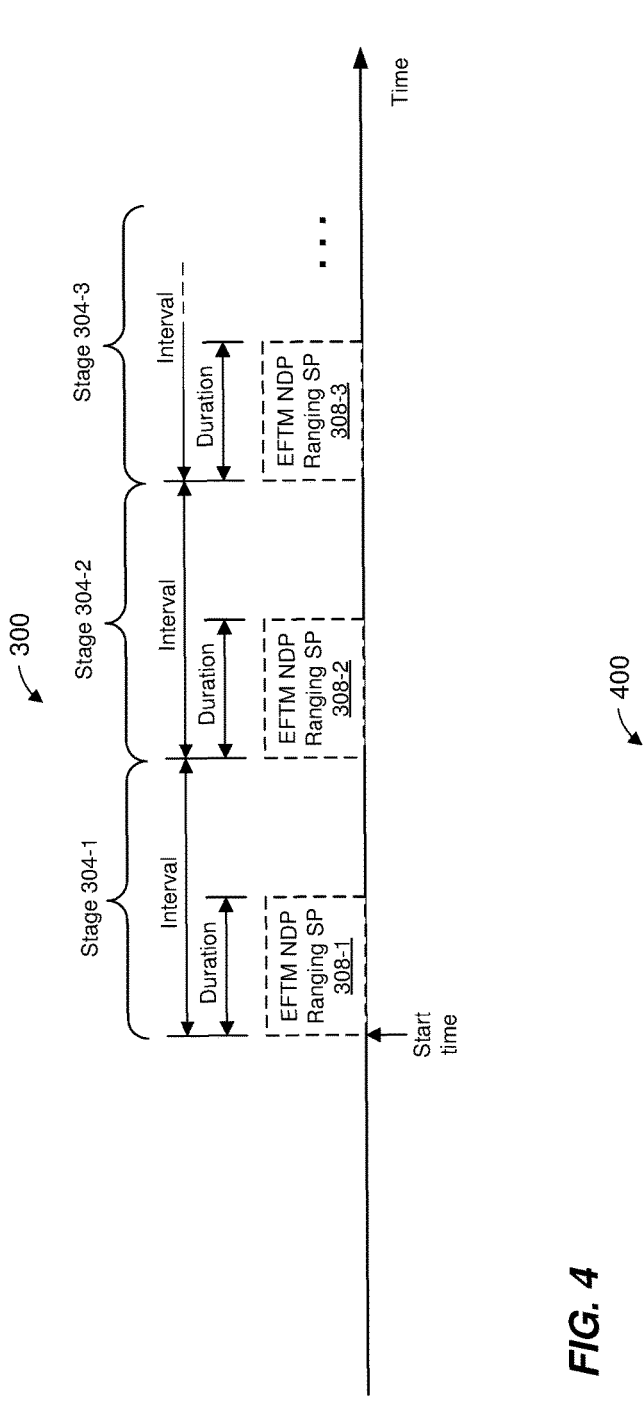
FIG. 3 is a diagram of an example MU ranging measurement procedure, according to an embodiment.

FIG. 3 is a timing diagram of an example MU ranging measurement procedure 300, according to an embodiment. The diagram of FIG. 3 is described in the context of the example network 110 merely for explanatory purposes. In some embodiments, signals illustrated in FIG. 3 are generated by other suitable communication devices in other suitable types of wireless networks.

The MU ranging measurement procedure 300 begins at a start time and includes a plurality of stages 304. In an embodiment, the AP 114 performs one or more MU ranging measurement exchanges, and optionally one or more single-user (SU) ranging measurement exchanges, with different sets of client stations 154 in the stages 304. Each stage 304 includes a time slot 308 (sometimes referred to herein as an enhanced fine timing measurement (EFTM) service period (SP)). In an embodiment, a first time slot 308-1 begins at the start time of the MU ranging measurement procedure 300. The time slots 308 occur at a time interval.

The AP 114 schedules a set of client stations 154 to participate in one or more ranging measurement exchanges (e.g., the MU ranging measurement exchange 200 of FIG. 2A or another suitable MU ranging measurement exchange) during each stage 304. If only one client station 154 is scheduled to participate during a particular stage 304, the AP 114 and the one client station 154 participate in an SU ranging measurement exchange, according to an embodiment.

In an embodiment, within each of one or more of the time slots 308, the AP 114 transmits to client stations 154 one or more packets (sometimes referred to herein as "scheduling packets") that indicates which set of client stations 154 are to participate in the one or more ranging measurement exchanges in the corresponding stage 304. If a client station 154 determines, based on receiving the one or more scheduling packets during a time slot 308, that the client station 154 is not to participate in a ranging measurement exchange during the corresponding stage 304, the network interface device 162 of the client station 154 is permitted to transition to a low power state (sometimes referred to herein as a sleep state) upon an end of the time slot 308, according to an embodiment. For example, the network interface device 162 is permitted to transition to the low power state at the end of the time slot 308 and to remain in the low power state until a beginning of the next time slot 308 in the next stage 304. Prior to a beginning of the next time slot 308, the network interface device 162 transitions to an active state so that the network interface device 162 is ready to receive from the AP 114 within the next time slot 308 the one or more scheduling packets that indicates which set of client stations 154 are to participate in the one or more ranging measurement exchanges in the next stage 304.

In an embodiment, the network interface device 162 has knowledge of the start time of the MU ranging measurement procedure 300, the time interval of the stages 304, and a duration of each time slot 308, and the network interface device 162 uses the start time, the time interval of the stages 304, and the duration of each time slot 308 to determine when the network interface device 162 can be in the low power state and when the network interface device 162 is to be in the active state during the MU ranging measurement procedure 300.

To facilitate an MU ranging measurement procedure such as the MU ranging measurement procedure 300 discussed above, the AP 114 communicates to the client stations 154 an indication of a start time of the MU ranging measurement procedure, an indication of a time interval of the stages of the MU ranging measurement procedure, and an indication of a duration of each time slot, according to some embodiments.

In some embodiments, the AP 114 transmits a plurality of SU packets to a plurality of client stations 154 prior to an MU ranging measurement procedure to provide the plurality of client stations 154 with an indication of the start time of the MU ranging measurement procedure, an indication of a time interval of the stages of the MU ranging measurement procedure, and an indication of a duration of each time slot. For example, in an embodiment, the AP 114 transmits respective SU packets to respective client stations 154 prior to an MU ranging measurement procedure, where each SU packet includes an indication of the start time of the MU ranging measurement procedure, an indication of a time interval of the stages of the MU ranging measurement procedure, and an indication of a duration of each time slot.

Figure 4:
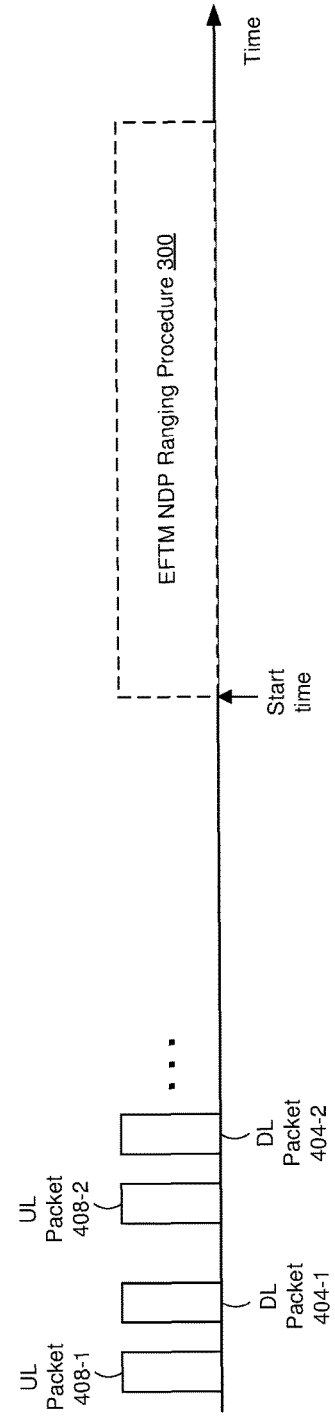
FIG. 4 is a timing diagram of an example transmission exchange in which the AP 114 transmits a plurality of single-user (SU) packets to a plurality of client stations prior to the MU ranging measurement procedure of FIG. 3 to provide timing information regarding the MU ranging measurement procedure of FIG. 3, according to an embodiment.

FIG. 4 is a timing diagram of an example transmission exchange 400 in which the AP 114 transmits a plurality of SU packets to a plurality of client stations 154 prior to the MU ranging measurement procedure 300 to provide the plurality of client stations 154 with an indication of the start time of the MU ranging measurement procedure 300, an indication of the time interval of the stages of the MU ranging measurement procedure 300, and an indication of a duration of each time slot 308 of the MU ranging measurement procedure 300, according to an embodiment. The diagram of FIG. 4 is described in the context of the example network 110 merely for explanatory purposes. In some embodiments, signals illustrated in FIG. 4 are generated by other suitable communication devices in other suitable types of wireless networks.

The network interface device 122 of the AP 114 generates a plurality of packets 404, each packet 404 corresponding to a respective client station 154. Each packet 404 includes an MPDU (e.g., a frame) having the indication of the start time of the MU ranging measurement procedure 300, the indication of the time interval of the stages of the MU ranging measurement procedure 300, and the indication of the duration of each time slot 308 of the MU ranging measurement procedure 300, according to an embodiment. The network interface device 122 of the AP 114 transmits each packet 404 as an SU transmission to a respective client station 154, according to an embodiment.

In an embodiment, each packet 404 is transmitted in response to the network interface device 122 of the AP 114 successfully receiving a packet 408 from the corresponding client station 154.

In an embodiment, the packet 408 includes a request frame (sometimes referred to herein as an "EFTM request frame") for a negotiation of a service period and one or more other measurement related parameters (e.g. measurement feedback type), corresponding to an MU ranging measurement exchange, such as the example MU ranging measurement exchange 200 of FIG. 2A. In an embodiment, the EFTM request frame includes an indication that the client station 154 seeks to perform a ranging measurement exchange with the AP 114. In some embodiments, the EFTM request frame also includes capability information regarding the types of feedback information the client station 154 can provide. In an embodiment, the AP 114 generates and transmits an ACK frame (not shown) that acknowledges the packet 408.

In some embodiments in which the packet 408 includes an EFTM request frame, the packet 404 includes a response frame (sometimes referred to herein as an "EFTM response frame") corresponding to an MU ranging measurement exchange, such as the example MU ranging measurement exchange 200 of FIG. 2A. In an embodiment, the EFTM response frame is responsive to the EFTM request frame discussed above and indicates that the AP 114 will participate in a ranging measurement exchange with the client station 154. In an embodiment, the EFTM response frame includes the indication of the start time of the MU ranging measurement procedure 300, the indication of the time interval of the stages of the MU ranging measurement procedure 300, and the indication of the duration of each time slot 308 of the MU ranging measurement procedure 300, according to an embodiment. In some embodiments, the EFTM response frame also includes information regarding requested feedback content such as one or more of i) whether the AP 114 is requesting AoA information, ii) whether the AP 114 is requesting AoD information, iii) whether the AP 114 is requesting channel estimate information, iv) requested channel estimation information granularity, etc. In an embodiment, the client station 154 generates and transmits an ACK frame (not shown) that acknowledges the packet 404.

In some embodiments, the packet 408 includes a target wake time (TWT) request element that includes an indication of a request to participate in a TWT procedure. In some embodiments, the packet 408 also includes an EFTM request element includes an indication that the client station 154 seeks to perform a ranging measurement exchange with the AP 114. In some embodiments, the EFTM request element also includes capability information regarding the types of feedback information the client station 154 can provide. In some embodiments, the EFTM request element is a subelement included in the TWT request element. In some embodiments, the EFTM request is an element separate from the TWT request element. In an embodiment, the TWT request element and the EFTM request element are included in a single MPDU within the packet 408. In another embodiment, the TWT request element and the EFTM request element are included in separate MPDUs (e.g., separate MPDUs in an aggregate MPDU (A-MPDU)) within the packet 408.

In embodiments in which the packet 408 includes a TWT request element, the packet 404 includes a frame with TWT response element that is responsive to the TWT request element discussed above and indicates that the AP 114 will participate in the TWT procedure. The TWT response element includes an indication of a start time of a TWT procedure (which corresponds to the start time of the MU ranging measurement procedure 300), an indication of a time interval of stages of the TWT procedure (which corresponds to the time interval of the stages 308 of the MU ranging measurement procedure 300), and an indication of a minimum wake duration of each of a plurality of time slots in the stages of the TWT procedure (which corresponds to the duration of each time slot 308 of the MU ranging measurement procedure 300), according to an embodiment. In some embodiments in which the packet 408 includes an EFTM request element, the packet 408 also includes an EFTM response element that does not include the indication of the start time of the MU ranging measurement procedure 300, the indication of the time interval of the stages of the MU ranging measurement procedure 300, and the indication of the duration of each time slot 308 of the MU ranging measurement procedure 300. Rather, the EFTM request element includes other information regarding the MU ranging measurement procedure, such as requested feedback content such as one or more of i) whether the AP 114 is requesting AoA information, ii) whether the AP 114 is requesting AoD information, iii) whether the AP 114 is requesting channel estimate information, iv) requested channel estimation information granularity, etc.

In some embodiments, the EFTM response element is a subelement included in the TWT response element. In some embodiments, the EFTM response element is an element separate from the TWT response element. In an embodiment, the TWT response element and the EFTM response element are included in a single MPDU within the packet 404. In another embodiment, the TWT response element and the EFTM response element are included in separate MPDUs (e.g., separate MPDUs in an A-MPDU) within the packet 404.

In some embodiments, the AP 114 assigns association identifiers (AIDs) to client stations 154 upon the client stations 154 becoming associated with a basic service set (BSS) managed by the AP 114. The AP 114, however, sometimes performs a ranging measurement exchange with one or more client stations 154 that have not yet become associated with the BSS (sometimes referred to as "unassociated client stations"), in some embodiments. Thus, the AP 114 assigns preliminary AIDs (pre-AIDs) to at least some unassociated client stations 154 prior to the exchange 400, according to some embodiments. A packet 404 intended for unassociated client station 154 includes a pre-AID of the client station 154 in one or both of a PHY header of the packet 404 or an MPDU (e.g., in a MAC header of the MPDU) in the packet 404, in some embodiments. Similarly, a packet 408 from an unassociated client station 154 includes a pre-AID of the client station 154 in one or both of a PHY header of the packet 408 or an MPDU (e.g., in a MAC header of the MPDU) in the packet 408, in some embodiments.

In the examples discussed with reference to FIG. 4, the AP 114 provides information regarding an MU ranging measurement procedure to a plurality of client station 154 via SU transmissions of respective packets to the client stations 154. The AP 114 provides information regarding the MU ranging measurement procedure to multiple client stations 154 additionally or alternatively using an MU transmission to the multiple client stations 154, according to some embodiments.

FIG. 5 is a timing diagram of an example transmission exchange 500 in which the AP 114 performs an MU transmission to a plurality of client stations 154 prior to the MU ranging measurement procedure 300 to provide the plurality of client stations 154 with an indication of the start time of the MU ranging measurement procedure 300, an indication of the time interval of the stages of the MU ranging measurement procedure 300, and an indication of a duration of each time slot 308 of the MU ranging measurement procedure 300, according to an embodiment. The diagram of FIG. 5 is described in the context of the example network 110 merely for explanatory purposes. In some embodiments, signals illustrated in FIG. 5 are generated by other suitable communication devices in other suitable types of wireless networks.

The network interface device 122 of the AP 114 generates a downlink (DL) PPDU 504 having a trigger frame configured to prompt a plurality of client stations 154 to transmit as part of an uplink (UL) MU transmission 508 (e.g., an UL orthogonal frequency division multiple access (OFDMA) transmission and/or an UL MU-multiple-input-multiple-output (MU-MIMO) transmission). In an embodiment, the trigger frame in the DL PPDU 504 includes information that prompts client stations 154 to provide, in the UL MU transmission 508, information regarding their availability to participate in a ranging measurement procedure. The network interface device 122 of the AP 114 then transmits the DL PPDU 504.

In response to the DL PPDU 504, multiple client stations 154 simultaneously transmit as part of the UL MU transmission 508 (e.g., an UL OFDMA transmission and/or an UL MU-MIMO transmission). The UL MU transmission 508 includes information regarding availability of client stations 154 to participate in a ranging measurement procedure. The network interface device 122 of the AP 114 analyzes the information regarding the availability of client stations 154 to participate in the ranging measurement procedure to determine a group of client stations 154 to which the AP 114 is to transmit information regarding a MU ranging measurement procedure such as the MU ranging measurement procedure 300. In some embodiments, the UL MU transmission 508 includes respective capability information regarding the types of feedback information the client stations 154 can provide. In some embodiments, the UL MU transmission 508 utilizes a random access OFDMA technique such as described in draft 2.2 of the IEEE 802.11ax Standard, dated February 2018.

In an embodiment, the network interface device 122 of the AP 114 generates a DL MU PPDU 512 that includes information corresponding to an MU ranging measurement procedure, such as the example MU ranging measurement procedure 300 of FIG. 3. For example, in an embodiment, the information corresponding to the MU ranging measurement procedure includes the indication of the start time of the MU ranging measurement procedure 300, the indication of the time interval of the stages of the MU ranging measurement procedure 300, and the indication of the duration of each time slot 308 of the MU ranging measurement procedure 300, according to an embodiment. In some embodiments, the information corresponding to the MU ranging measurement procedure also includes respective information regarding requested feedback content from multiple client stations such as one or more of i) whether the AP 114 is requesting AoA information from the respective client station 154, ii) whether the AP 114 is requesting AoD information from the respective client station 154, iii) whether the AP 114 is requesting channel estimate information from the respective client station 154, iv) requested channel estimation information granularity from the respective client station 154, etc.

In another embodiment, the trigger frame in the DL PPDU 504 is configured to prompt an UL MU transmission similar to an UL MU transmission according to the NDP feedback procedure described in draft 2.2 of the IEEE 802.11ax Standard, dated February 2018.

In some embodiments, methods described with reference to FIGS. 4 and 5 are combined. For example, in an embodiment, the AP 114 obtains information regarding the availability of one or more client stations 154 to participate in a ranging measurement procedure via SU transmissions such as packets 404 and 408 in FIG. 4, and obtains information regarding the availability of other client stations 154 to participate in the ranging measurement procedure via an UL MU transmission such as the UL MU transmission 508 in FIG. 5. The AP 114 then uses a DL MU transmission such as the DL MU PPDU 512 in FIG. 5 to provide the client stations 154 with information corresponding to an MU ranging measurement procedure such as described above. As another example, the AP 114 uses a procedure such as in FIG. 4 to provide one or more client stations 154 with information corresponding to an MU ranging measurement procedure, and uses a procedure such as in FIG. 5 to provide other client stations 154 with information corresponding to the MU ranging measurement procedure, according to another embodiment.

In some embodiments, the AP 114 solicits client stations 154 to use an UL OFDMA random access technique to transmit EFTM requests in the UL MU transmission 508. For example, the AP 114 allocates one or more resource units (RUs) for random access in the UL MU transmission 508, and one or more client stations contend for the one or more RUs reserved for random access to transmit EFTM requests in the one or more RUs reserved for random access as part of the UL MU transmission 508.

In the examples discussed with reference to FIGS. 4 and 5, the AP 114 provides information regarding an MU ranging measurement procedure to a plurality of client station 154 via SU and/or MU transmissions to the client stations 154. The AP 114 provides information regarding the MU ranging measurement procedure to multiple client stations 154 additionally or alternatively using a broadcast transmission to the multiple client stations 154, according to some embodiments.

FIG. 6 is a timing diagram of an example transmission exchange 600 in which the AP 114 performs a broadcast transmission to a plurality of client stations 154 prior to the MU ranging measurement procedure 300 to provide the plurality of client stations 154 with an indication of the start time of the MU ranging measurement procedure 300, an indication of the time interval of the stages of the MU ranging measurement procedure 300, and an indication of a duration of each time slot 308 of the MU ranging measurement procedure 300, according to an embodiment. The diagram of FIG. 6 is described in the context of the example network 110 merely for explanatory purposes. In some embodiments, signals illustrated in FIG. 6 are generated by other suitable communication devices in other suitable types of wireless networks.

The network interface device 122 of the AP 114 generates a packet 604 having a beacon frame. The beacon frame 604 includes information corresponding to an MU ranging measurement procedure, such as the example MU ranging measurement procedure 300 of FIG. 3. For example, in an embodiment, the information corresponding to the MU ranging measurement procedure includes the indication of the start time of the MU ranging measurement procedure 300, the indication of the time interval of the stages of the MU ranging measurement procedure 300, and the indication of the duration of each time slot 308 of the MU ranging measurement procedure 300, according to an embodiment.

In another embodiment, the packet 604 includes a probe response frame that includes information corresponding to an MU ranging measurement procedure. In another embodiment, the packet 604 includes an association response frame that includes information corresponding to an MU ranging measurement procedure.

In some embodiments, method described with reference to FIG. 6 is combined with methods described above with respect to FIG. 4 and/or FIG. 5. For example, in an embodiment, the AP 114 obtains information regarding the availability of one or more client stations 154 to participate in a ranging measurement procedure via SU transmissions such as packets 404 and 408 in FIG. 4. In some embodiments, the AP 114 additionally or alternatively obtains information regarding the availability of other client stations 154 to participate in the ranging measurement procedure via an UL MU transmission such as the UL MU transmission 508 in FIG. 5. The AP 114 then uses the packet 604 in FIG. 6 to provide the client stations 154 with information corresponding to an MU ranging measurement procedure such as described above. As another example, the AP 114 uses a procedure such as in FIG. 4 to provide one or more client stations 154 with information corresponding to an MU ranging measurement procedure and/or uses a procedure such as in FIG. 5 to provide other client stations 154 with information corresponding to the MU ranging measurement procedure, and also uses a procedure such as in FIG. 6 to provide client stations 154 with information corresponding to the MU ranging measurement procedure, according to another embodiment.

In an embodiment, the AP 114 obtains information regarding the availability of one or more client stations 154 to participate in a ranging measurement procedure via SU transmissions such as packets 404 and 408 in FIG. 4 and/or via an UL MU transmission such as the UL MU transmission 508 in FIG. 5; the AP 114 then provides, in the DL MU PPDU 512, information regarding a service period (e.g., a start time of the service period and a duration of the service period) in which the broadcast packet 604 will be transmitted. Network interface devices 162 of the client stations 154 can then transition to the low power state, remain in the low power state until prior to the service period, and then transition to the active state to receive the broadcast packet 604, according to an embodiment.

Figure 7:
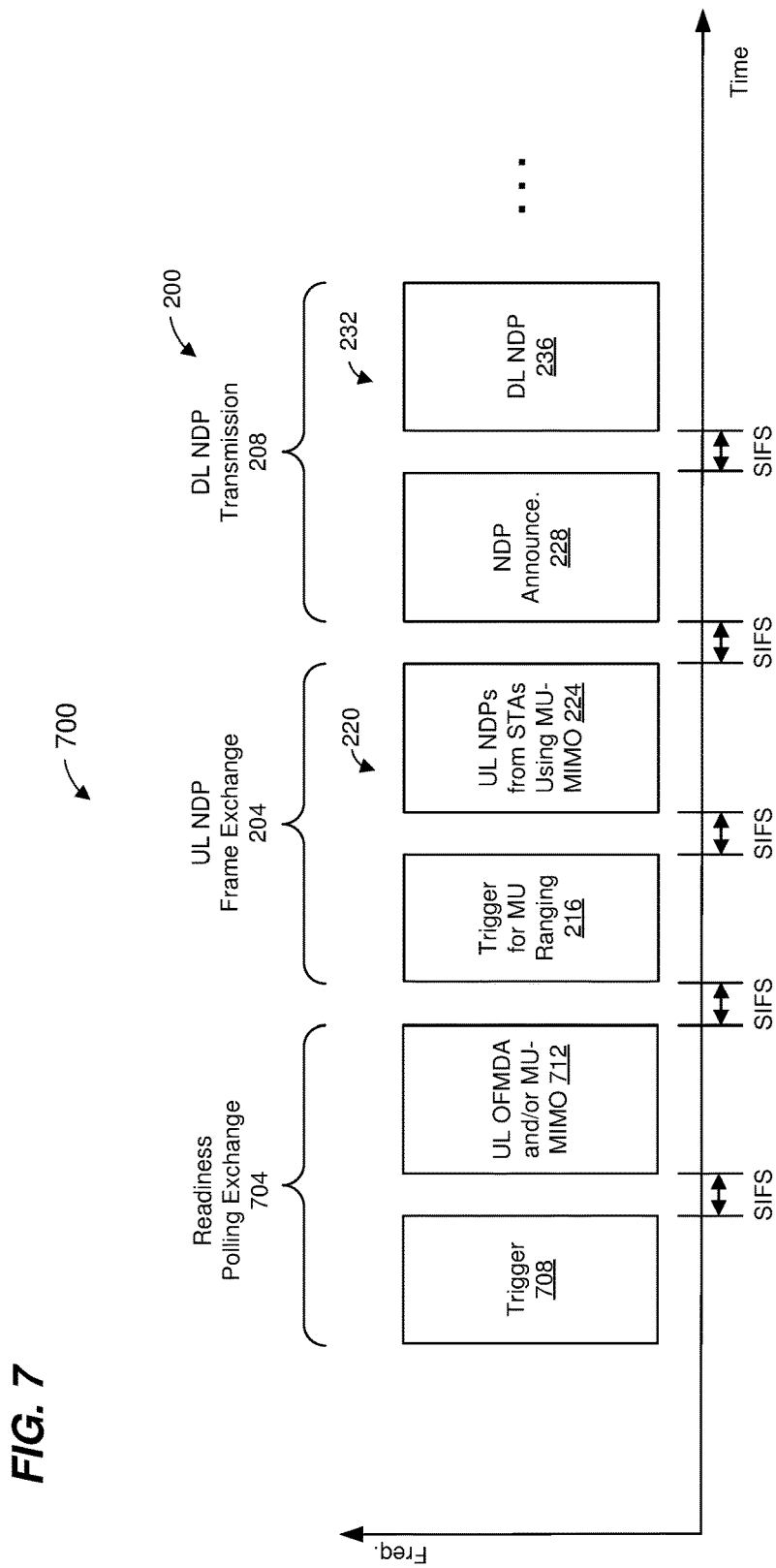
FIG. 7 is diagram of an example ranging measurement exchange in which a readiness polling exchange occurs prior to the example ranging measurement exchange of FIG. 2A, according to an embodiment.

Referring again to FIG. 3, during a state 304 (e.g., at a beginning of the stage 304), the AP 114 may poll client stations 154 to determine a set of client stations 154 that are available to participate in a ranging measurement exchange (e.g., such as the ranging measurement exchange 200) during the stage 304. FIG. 7 is diagram of an example ranging measurement exchange 700 in which a readiness polling exchange 704 occurs prior to the example ranging measurement exchange 200 of FIG. 2A, according to an embodiment. The diagram of FIG. 7 is described in the context of the example network 110 merely for explanatory purposes. In some embodiments, signals illustrated in FIG. 7 are generated by other suitable communication devices in other suitable types of wireless networks.

The network interface device 122 of the AP 114 generates a DL PPDU 708 having a trigger frame configured to prompt a plurality of client stations 154 to transmit as part of an UL MU transmission 712 (e.g., an UL OFDMA transmission and/or an UL MU-MIMO transmission). In an embodiment, the trigger frame in the DL PPDU 708 includes information that prompts client stations 154 to provide, in the UL MU transmission 712, information regarding their readiness to participate in the ranging measurement exchange 200. The network interface device 122 of the AP 114 then transmits the DL PPDU 708.

In response to the DL PPDU 708, multiple client stations 154 simultaneously transmit as part of the UL MU transmission 712 (e.g., an UL OFDMA transmission and/or an UL MU-MIMO transmission) a defined time period after an end of the DL PPDU 708. In an embodiment, the defined time period is SIFS. In other embodiments, another suitable time period is utilized. The UL MU transmission 712 includes information regarding readiness of client stations 154 to participate in the ranging measurement exchange

200. The network interface device 122 of the AP 114 analyzes the information regarding the readiness of client stations 154 to determine a set of client stations 154 that will participate in the ranging measurement exchange 200. In some embodiments, the UL MU transmission 712 utilizes a random access OFDMA technique such as described in draft 2.2 of the IEEE 802.11ax Standard, dated February 2018.

In an embodiment, the trigger frame 708 includes a type field set to a value that indicates that the trigger frame 708 corresponds to an MU ranging measurement exchange. In an embodiment, the type field of the trigger frame 708 is set to a same value as in a type field of the trigger frame 216 and/or the trigger frame 260 (FIG. 2A), and other information in the trigger frame 708 distinguishes the trigger frame 708 from the trigger frame 216 and/or from the trigger frame 260. For example, in an embodiment, the trigger frame 708 includes a trigger dependent common information field that includes information that distinguishes the trigger frame 708 from the trigger frame 216 and/or from the trigger frame 260 and indicates that the trigger frame 708 is for prompting station readiness information. As another example, in an embodiment, the trigger frame 708 includes an AID field that includes an AID value that distinguishes the trigger frame 708 from the trigger frame 216 and/or from the trigger frame 260 and indicates that the trigger frame 708 is for prompting station readiness information.

In another embodiment, the type field of the trigger frame 708 is set to a value corresponding to a basic trigger as defined in the draft 2.2 of the IEEE 802.11ax Standard, dated February 2018. In such an embodiment, the network interface device 122 generates the trigger frame 708 to include AIDs of client stations 154 that are to participate in the UL MU transmission 712.

Although one readiness polling exchange 704 is illustrated in FIG. 7, in some embodiments the MU ranging measurement exchange 700 includes multiple polling exchanges 704. For example, the AP 114 may poll different sets of client stations 154 in respective polling exchanges 704. In some embodiments, different sets of client station 154 have different ranging requirements/capabilities (e.g., no security capability, MAC security, PHY security, etc.), and the AP 114 polls the different sets of client stations 154 in respective polling exchanges 704. In some embodiments, different sets of client station 154 have different number of spatial stream capabilities, and the AP 114 polls the different sets of client stations 154 in respective polling exchanges 704.

In another embodiment, the trigger frame 708 is configured to prompt an UL MU transmission similar to an UL MU transmission according to the NDP feedback procedure described in draft 2.2 of the IEEE 802.11ax Standard, dated February 2018.

In embodiments in which the UL MU transmission 712 includes an UL random access OFDMA transmission, transmissions of associated stations are restricted to contending in a first set of resource units (e.g., in a first set of frequency portions), and transmissions of unassociated stations are restricted to contending in a second set of resource units (e.g., in a second set of frequency portions) different than and not overlapping with the first set of resource units.

As illustrated in FIG. 7, AP 114 begins transmitting the DL PPDU 216 a defined time period after an end of the UL MU transmission 712. In an embodiment, the defined time period is SIFS. In other embodiments, another suitable time period is utilized.

To provide the AP 114 with additional time for processing information in the UL MU transmission 712 to determine a set of client stations 154 to participate in the MU ranging measurement exchange 200, the network interfaces 162 of the client station 154 include packet extension (PE) fields appended at the ends of PPDUs in the UL MU transmission 712.

Figure 8:
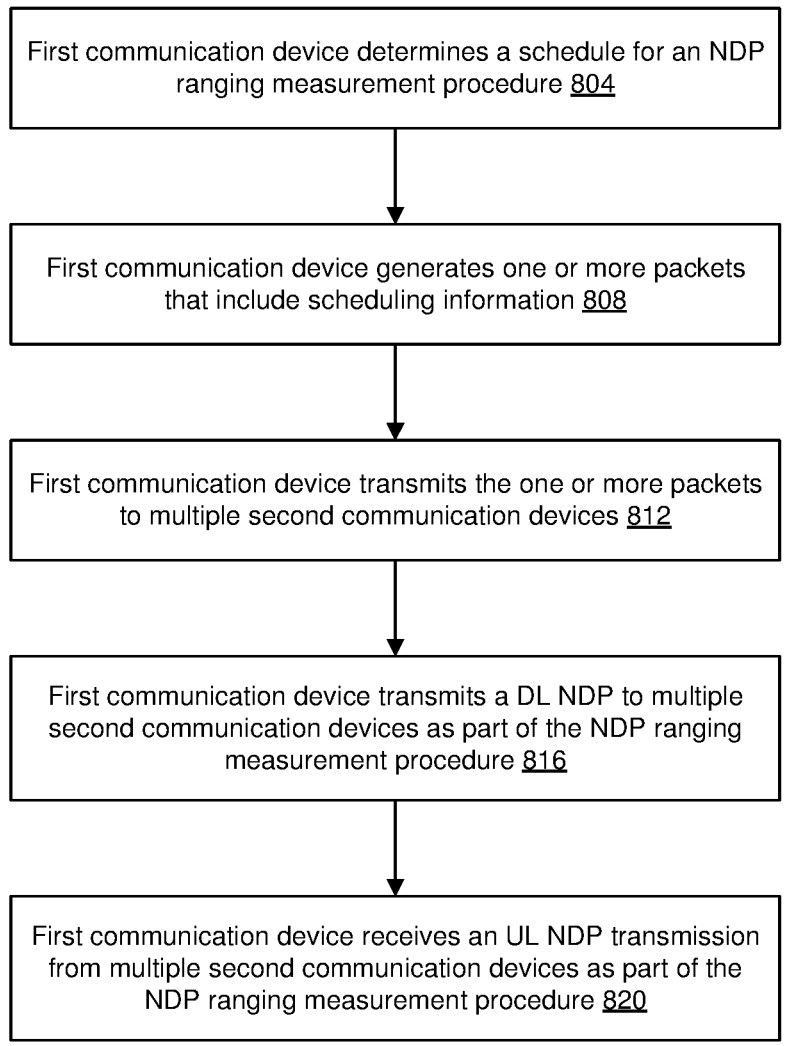
FIG. 8 is a flow diagram of an example method for performing a ranging measurement procedure, according to an embodiment.

FIG. 8 is a flow diagram of an example method 800 for performing a ranging measurement procedure, according to an embodiment. In some embodiments, the network interface device 122 of FIG. 1 is configured to implement the method 800. For ease of explanation, the method 800 is described in the context of the network interface device 122 implementing the method 800. In other embodiments, however, the method 800 is implemented by another suitable communication device.

At block 804, a first communication device (e.g., the network interface device 122) determines a schedule for an NDP ranging measurement procedure involving multiple second communication devices (e.g., client stations 154). In various embodiments, block 804 includes determining one of or any suitable combination of two or more of i) a start time of the NDP ranging measurement procedure, ii) a time interval between adjacent time slots during the NDP ranging measurement procedure, and iii) a duration of each of multiple time slots among a plurality of time slots during the NDP ranging measurement procedure. In an embodiment, each time slot is at least for the network interface device 122 to schedule one or more client stations 154 to participate in an exchange of NDPs for ranging measurement during the ranging measurement procedure.

At block 808, the network interface device 122 generates one or more packets that include one of, or any suitable combination of two or more of, i) an indication of the start time of the NDP ranging measurement procedure, ii) an indication of the time interval between adjacent time slots during the NDP ranging measurement procedure, and iii) an indication of the duration of the each of the multiple time slots. In an embodiment, the one or more packets include one or more SU packets. In an embodiment, the one or more packets include one or more MU packets (e.g., OFDMA and/or MU-MIMO). In an embodiment, the one or more packets include one or more broadcast packets. In an embodiment, the one or more packets includes a beacon frame. In an embodiment, the one or more packets includes a probe response frame. In an embodiment, the one or more packets includes an association response frame.

At block 812, the network interface device 122 transmits the one or more packets to the multiple client stations 154 prior to the NDP ranging measurement procedure. In an embodiment, block 812 include transmitting one or more packets as a SU transmission. In an embodiment, block 812 includes transmitting one or more packets as a MU transmission (e.g., OFDMA and/or MU-MIMO). In an embodiment, block 812 includes transmitting one or more packets as a broadcast transmission.

At block 816, the network interface device 122 transmits a downlink NDP transmission to a group of client stations 154 during the NDP ranging measurement procedure. For example, the network interface device 122 transmits the DL NDP 236 during the MU ranging measurement exchange 200.

At block 820, the network interface device 122 receive an uplink multi-user NDP transmission from the group of client stations 154 during the NDP ranging measurement procedure. For example, the network interface device 122 receives the UL NDPs 224 during the MU ranging measurement exchange 200.

Figure 9:
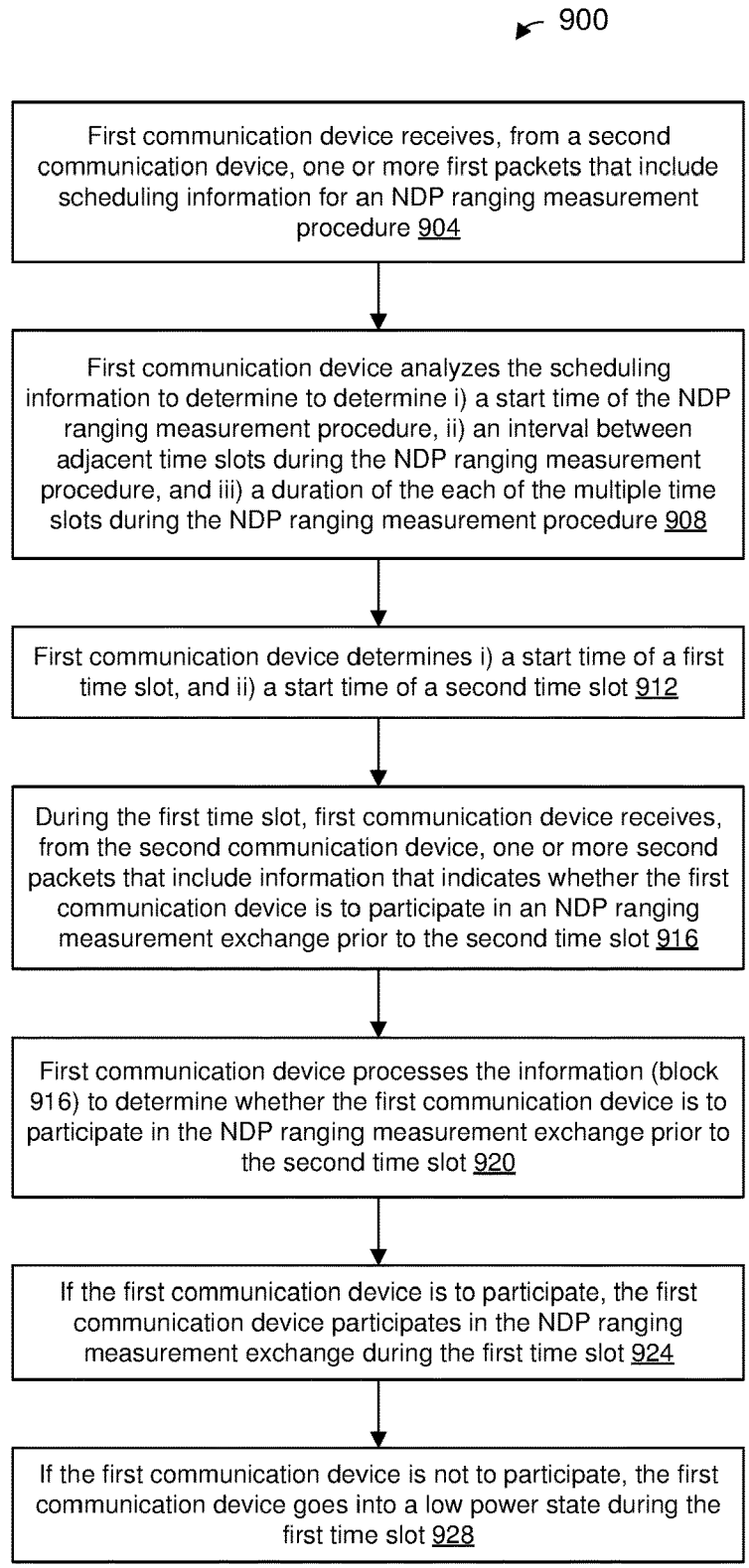
FIG. 9 is a flow diagram of an example method associated with a ranging measurement procedure, according to an embodiment.

FIG. 9 is a flow diagram of an example method 900 associated with a ranging measurement procedure, according to an embodiment. In some embodiments, the network interface device 162 of FIG. 1 is configured to implement the method 900. For ease of explanation, the method 900 is described in the context of the network interface device 162 implementing the method 900. In other embodiments, however, the method 900 is implemented by another suitable communication device.

At block 904, a first communication device (e.g., the network interface device 162) receives one or more first packets from a second communication device (e.g., the AP 114), wherein the one or more packets include scheduling information regarding an NDP ranging measurement procedure involving the client station 154 communication device, the AP 114, and one or more other client stations 154. In embodiment, the scheduling information includes i) an indication of a start time of the NDP ranging measurement procedure, ii) an indication of a time interval between adjacent time slots during the NDP ranging measurement procedure, and iii) an indication of a duration of each of multiple time slots among a plurality of time slots during the NDP ranging measurement procedure.

In an embodiment, the one or more packets include one or more SU packets addressed to the client station 154. In an embodiment, the one or more packets include one or more MU packets (e.g., OFDMA and/or MU-MIMO) addressed to a group of communication devices including the client station 154. In an embodiment, the one or more packets include one or more broadcast packets. In an embodiment, the one or more packets includes a beacon frame. In an embodiment, the one or more packets includes a probe response frame. In an embodiment, the one or more packets includes an association response frame.

At block 908, the network interface device 162 analyzes the scheduling information in the one or more first packets to determine i) the start time of the NDP ranging measurement procedure, ii) the time interval between adjacent time slots during the NDP ranging measurement procedure, and iii) the duration of the each of the multiple time slots during the NDP ranging measurement procedure.

At block 912, the network interface device 162 uses at least i) the start time of the NDP ranging measurement procedure, and ii) the time interval between adjacent time slots during the NDP ranging measurement procedure, to determine at least i) a start time of a first time slot among the multiple time slots, and ii) a start time of a second time slot among the multiple time slots, wherein the second time slot follows the first time slot.

At block 916, the network interface device 162 receives, during the first time slot, one or more second packets from the AP 114. The one or more second packets include information that indicates whether the client station 154 is to participate in an NDP ranging measurement exchange prior to the second time slot. In an embodiment, the one or more second packets includes the trigger in the DL PPDU 216.

At block 920, the network interface device 162 processes the information in the one or more second packets to determine whether the client station 154 is to participate in the NDP ranging measurement exchange prior to the second time slot.

At block 924, when the network interface device 162 determines that the client station 154 is to participate in the NDP ranging measurement prior to the second time slot, the network interface device 162 participates in the NDP ranging measurement exchange prior to the second time slot. In an embodiment, participating in the NDP ranging measurement exchange prior to the second time slot includes: the network interface device 162 transmitting a first NDP transmission to the second communication device; and the network interface device 162 receiving a second NDP transmission from the AP 114.

At block 928, when the network interface device 162 determines that the client station 154 is not to participate in the NDP ranging measurement prior to the second time slot, the network interface device 162 transitions to a low power state, and later transitions from the low power state to the active state prior to the determined start time of the second time slot.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing a ranging measurement procedure, the method comprising:
   determining, at a first communication device, a schedule for a null data packet (NDP) ranging measurement procedure involving multiple second communication devices, including determining i) a start time of the NDP ranging measurement procedure, ii) a time duration of each time slot of a plurality of time slots during the NDP ranging measurement procedure, and iii) a time interval between adjacent time slots of the plurality of time slots during the NDP ranging measurement procedure, wherein each time slot of the plurality of time slots is at least for the first communication device to schedule one or more second communication devices to participate in an exchange of NDPs for ranging measurement during the ranging measurement procedure;
   generating, at the first communication device, one or more packets that include: i) an indication of the start time of the NDP ranging measurement procedure, ii) an indication of the time duration of each time slot of the plurality of time slots during the NDP ranging measurement procedure, and iii) an indication of the time interval between adjacent time slots of the plurality of time slots during the NDP ranging measurement procedure;
   transmitting, by the first communication device, the one or more packets to the multiple second communication devices prior to the NDP ranging measurement procedure;

during the NDP ranging measurement procedure, transmitting, by the first communication device, a downlink NDP transmission to a group of second communication devices; and during the NDP ranging measurement procedure, receiving, at the first communication device, an uplink multi-user NDP transmission from the group of second communication devices.

2. The method of claim 1, wherein generating the one or more packets comprises:

generating one or more single user packets that include one or more of i) the indication of the start time of the NDP ranging measurement procedure, ii) the indication of the duration of each time slot of the plurality of time slots, and iii) the indication of the time interval between adjacent time slots of the plurality of time slots during the NDP ranging measurement procedure.

3. The method of claim 1, wherein generating the one or more packets comprises:

generating one or more multi-user packets that include one or more of i) the indication of the start time of the NDP ranging measurement procedure, ii) the indication of the duration of each time slot of the plurality of time slots, and iii) the indication of the time interval between adjacent time slots of the plurality of time slots during the NDP ranging measurement procedure.

4. The method of claim 1, wherein generating the one or more packets comprises:

generating a packet that includes a beacon frame having one or more of i) the indication of the start time of the NDP ranging measurement procedure, ii) the indication of the duration of each time slot of the plurality of time slots, and iii) the indication of the time interval between adjacent time slots of the plurality of time slots during the NDP ranging measurement procedure.

5. The method of claim 1, wherein generating the one or more packets comprises:

generating a packet that includes one of i) a probe response frame, or ii) an association response frame, wherein the one of i) the probe response frame, or the association response frame, includes one or more of a) the indication of the start time of the NDP ranging measurement procedure, b) the indication of the time interval between adjacent time slots during the NDP ranging measurement procedure, and c) the indication of the duration of the each of the multiple time slots.

6. An apparatus, comprising:

a network interface device associated with a first communication device, wherein the network interface device is implemented on one or more integrated circuit (IC) devices, and wherein the network interface device is configured to:

determine a schedule for a null data packet (NDP) ranging measurement procedure involving multiple second communication devices, including determining i) a start time of the NDP ranging measurement procedure, ii) a time duration of each time slot of a plurality of time slots during the NDP ranging measurement procedure, and iii) a time interval between adjacent time slots of the plurality of time slots during the NDP ranging measurement procedure, wherein each time slot of the plurality of time slots is at least for the first communication device to schedule one or more second communication devices to participate in an exchange of NDPs for ranging measurement during the ranging measurement procedure, generate one or more packets that include i) an indication of the start time of the NDP ranging measurement procedure, ii) an indication of the time duration of each time slot of the plurality of time slots during the NDP ranging measurement procedure, and iii) an indication of the time interval between adjacent time slots of the plurality of time slots during the NDP ranging measurement procedure, transmit the one or more packets to the multiple second communication devices prior to the NDP ranging measurement procedure, during the NDP ranging measurement procedure, transmit a downlink NDP transmission to a group of second communication devices, and during the NDP ranging measurement procedure, receive an uplink multi-user NDP transmission from the group of second communication devices.

7. The apparatus of claim 6, wherein the network interface device is configured to:

generating one or more single user packets that include one or more of i) the indication of the start time of the NDP ranging measurement procedure, ii) the indication of the time duration of each time slot of the plurality of time slots during the NDP ranging measurement procedure, and iii) the indication of the time interval between adjacent time slots of the plurality of time slots during the NDP ranging measurement procedure.

8. The apparatus of claim 6, wherein the network interface device is configured to:

generating one or more multi-user packets that include one or more of i) the indication of the start time of the NDP ranging measurement procedure, ii) the indication of the time duration of each time slot of the plurality of time slots during the NDP ranging measurement procedure, and iii) the indication of the time interval between adjacent time slots of the plurality of time slots during the NDP ranging measurement procedure.

9. The apparatus of claim 6, wherein the network interface device is configured to:

generating a packet that includes a beacon frame having one or more of i) the indication of the start time of the NDP ranging measurement procedure, ii) the indication of the time duration of each time slot of the plurality of time slots during the NDP ranging measurement procedure, and iii) the indication of the time interval between adjacent time slots of the plurality of time slots during the NDP ranging measurement procedure.

10. The apparatus of claim 6, wherein the network interface device is configured to:

generating a packet that includes one of i) a probe response frame, or ii) an association response frame, wherein the one of i) the probe response frame, or the association response frame, includes one or more of a) the indication of the start time of the NDP ranging measurement procedure, b) the indication of the time interval between adjacent time slots during the NDP ranging measurement procedure, and c) the indication of the duration of the each of the multiple time slots.

11. A method associated with a ranging measurement procedure, the method comprising:

receiving, at a first communication device, one or more first packets from a second communication device, wherein the one or more packets include scheduling information regarding a null data packet (NDP) ranging measurement procedure involving the first communication device, the second communication device, and one or more other communication devices, wherein the scheduling information includes i) an indication of a start time of the NDP ranging measurement procedure, ii) an indication of a time duration of each time slot of a plurality of time slots during the NDP ranging measurement procedure, and iii) an indication of a time interval between adjacent time slots of the plurality of time slots during the NDP ranging measurement procedure;

processing, at the first communication device, the scheduling information in the one or more first packets to determine i) the start time of the NDP ranging measurement procedure, ii) the time duration of each time slot of the plurality of time slots during the NDP ranging measurement procedure, and iii) the time interval between adjacent time slots of the plurality of time slots during the NDP ranging measurement procedure;

using at least i) the start time of the NDP ranging measurement procedure, and ii) the time interval between adjacent time slots during the NDP ranging measurement procedure, determining, at the first communication device, at least i) a start time of a first time slot among the plurality of time slots, and ii) a start time of a second time slot among the plurality of time slots, wherein the second time slot follows the first time slot;

during the first time slot, receiving, at the first communication device, one or more second packets from the second communication device, wherein the one or more second packets include information that indicates whether the first communication device is to participate in an NDP ranging measurement exchange prior to the second time slot;

processing, at the first communication device, the information in the one or more second packets to determine whether the first communication device is to participate in the NDP ranging measurement exchange prior to the second time slot;

when the first communication device determines that the first communication device is to participate in the NDP ranging measurement prior to the second time slot, participating in the NDP ranging measurement exchange prior to the second time slot, including:
  transmitting, by the first communication device, a first NDP transmission to the second communication device, and
  receiving, at the first communication device, a second NDP transmission from the second communication device; and when the first communication device determines that the first communication device is not to participate in the NDP ranging measurement prior to the second time slot:
  transitioning the first communication device to a low power state, and
  transitioning the first communication device from the low power state to the active state prior to the determined start time of the second time slot.

12. The method of claim 11, wherein receiving the one or more first packets comprises:
receiving one or more single user packets that include one or more of i) the indication of the start time of the NDP ranging measurement procedure, ii) the indication of the time duration of each time slot of the plurality of time slots during the NDP ranging measurement procedure, and iii) the indication of the time interval between adjacent time slots of the plurality of time slots during the NDP ranging measurement procedure.

13. The method of claim 11, wherein receiving the one or more first packets comprises:
receiving one or more multi-user packets that include one or more of i) the indication of the start time of the NDP ranging measurement procedure, ii) the indication of the time duration of each time slot of the plurality of time slots during the NDP ranging measurement procedure, and iii) the indication of the time interval between adjacent time slots of the plurality of time slots during the NDP ranging measurement procedure.

14. The method of claim 11, wherein receiving the one or more first packets comprises:
receiving a packet that includes a beacon frame having one or more of i) the indication of the start time of the NDP ranging measurement procedure, ii) the indication of the time duration of each time slot of the plurality of time slots during the NDP ranging measurement procedure, and iii) the indication of the time interval between adjacent time slots of the plurality of time slots during the NDP ranging measurement procedure.

15. The method of claim 11, wherein receiving the one or more first packets comprises:
receiving a packet that includes one of i) a probe response frame, or ii) an association response frame, wherein the one of i) the probe response frame, or ii) the association response frame, includes one or more of a) the indication of the start time of the NDP ranging measurement procedure, b) the indication of the time duration of each time slot of the plurality of time slots during the NDP ranging measurement procedure, and c) the indication of the time interval between adjacent time slots during the NDP ranging measurement procedure.

16. An apparatus, comprising:
a network interface device associated with a first communication device, wherein the network interface device is implemented on one or more integrated circuit (IC) devices, and wherein the network interface device is configured to:
  receive one or more first packets from a second communication device, wherein the one or more packets include scheduling information regarding a null data packet (NDP) ranging measurement procedure involving the first communication device, the second communication device, and one or more other communication devices, wherein the scheduling information includes i) an indication of a start time of the NDP ranging measurement procedure, ii) an indication of a time duration of each time slot of a plurality of time slots during the NDP ranging measurement procedure, and iii) an indication of a time interval between adjacent time slots of the plurality of time slots during the NDP ranging measurement procedure,
  process the scheduling information in the one or more first packets to determine i) the start time of the NDP ranging measurement procedure, ii) the time duration of each time slot of the plurality of time slots during the NDP ranging measurement procedure, and iii) the time interval between adjacent time slots of the plurality of time slots during the NDP ranging measurement procedure,
  use at least i) the start time of the NDP ranging measurement procedure, and ii) the time interval between adjacent time slots during the NDP ranging measurement procedure, determining, at the first communication device, at least i) a start time of a first time slot among the plurality of time slots, and ii) a start time of a second time slot among the plurality of time slots, wherein the second time slot follows the first time slot, during the first time slot, receive one or more second packets from the second communication device, wherein the one or more second packets include information that indicates whether the first communication device is to participate in an NDP ranging measurement exchange prior to the second time slot, process the information in the one or more second packets to determine whether the first communication device is to participate in the NDP ranging measurement exchange prior to the second time slot, when the network interface device determines that the first communication device is to participate in the NDP ranging measurement exchange prior to the second time slot, participate in the NDP ranging measurement exchange, including:

transmitting a first NDP transmission to the second communication device, and receiving a second NDP transmission from the second communication device; and wherein the network interface device is further configured to, when the network interface device determines that the first communication device is not to participate in the NDP ranging measurement prior to the second time slot:

transition the network interface device to a low power state, and transitioning the network interface device from the low power state to the active state prior to the determined start time of the second time slot.

17. The apparatus of claim 16, wherein the one or more one or more first packets include:

one or more single user packets having one or more of i) the indication of the start time of the NDP ranging measurement procedure, ii) the indication of the time duration of each time slot of the plurality of time slots during the NDP ranging measurement procedure, and iii) the indication of the time interval between adjacent time slots of the plurality of time slots during the NDP ranging measurement procedure.

18. The apparatus of claim 16, wherein the one or more one or more first packets include:

one or more multi-user packets having one or more of i) the indication of the start time of the NDP ranging measurement procedure, ii) the indication of the time duration of each time slot of the plurality of time slots during the NDP ranging measurement procedure, and iii) the indication of the time interval between adjacent time slots of the plurality of time slots during the NDP ranging measurement procedure.

19. The apparatus of claim 16, wherein the one or more one or more first packets include:

a packet having a beacon frame that includes one or more of i) the indication of the start time of the NDP ranging measurement procedure, ii) the indication of the time duration of each time slot of the plurality of time slots during the NDP ranging measurement procedure, and iii) the indication of the time interval between adjacent time slots of the plurality of time slots during the NDP ranging measurement procedure.

20. The apparatus of claim 16, wherein the one or more one or more first packets include:

a packet having one of i) a probe response frame, or ii) an association response frame, wherein the one of i) the probe response frame, or ii) the association response frame, includes one or more of a) the indication of the start time of the NDP ranging measurement procedure, b) the indication of the time duration of each time slot of the plurality of time slots during the NDP ranging measurement procedure, and c) the indication of the time interval between adjacent time slots during the NDP ranging measurement procedure.

* * * * *